April 10, 1928.
F. DE ROOS
1,665,493
LOADING CHUTE
Filed March 26, 1926
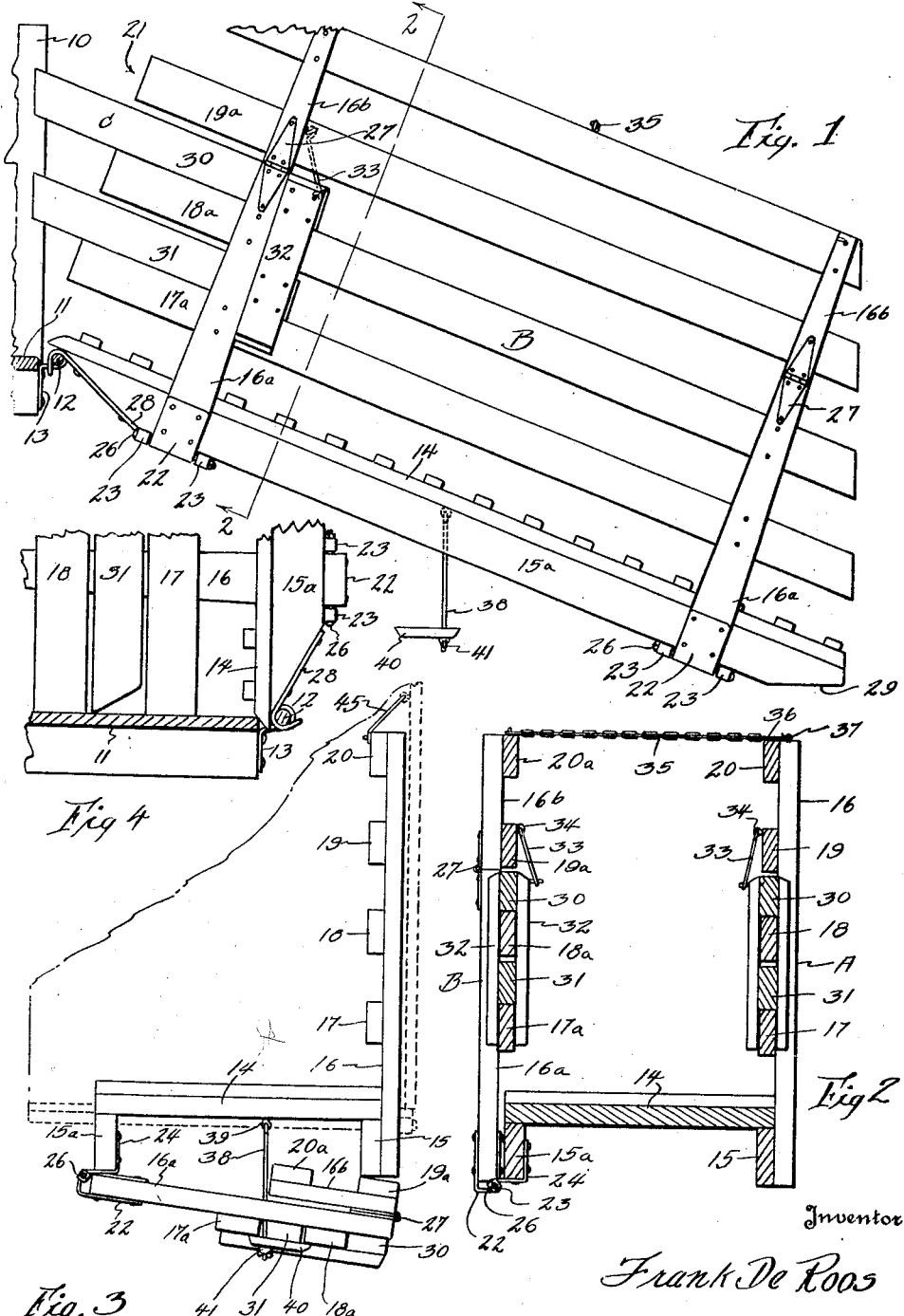
Inventor
Frank De Roos
By
Lynn H. Latta
Attorney Patented Apr. 10, 1928.

1,665,493

UNITED STATES PATENT OFFICE.

FRANK DE ROOS, OF SPRINGFIELD, SOUTH DAKOTA.

LOADING CHUTE.

Application filed March 26, 1926. Serial No. 97,585.

My invention relates to a loading chute for trucks, and it is my object to provide such a chute which is of simple, durable and inexpensive construction.

A further object of my invention is to provide a chute which may be collapsed so as to occupy a minimum of space in the truck, when not in use, the chute being so hinged to the truck as to serve as an end gate when in such collapsed position, the construction being as simple as possible, however, by the use of only one hinged side, the other side being rigid.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a side elevation of my loading chute attached to the rear end of a truck, which is shown in section.

Fig. 2 is a transverse sectional view taken on the line 2—2 of Fig. 1, and

Fig. 3 is an end view of the chute in collapsed position, standing on end in a truck, the latter being shown in dotted lines.

Fig. 4 is a detail vertical sectional view of a portion of the truck and chute, illustrating the chute in the position shown in Fig. 3.

I have used the reference character 10 to indicate generally a truck having a bottom, 11, and a transverse rod, 12, attached to the truck by means of brackets, 13. The loading chute comprises a bottom member, 14, secured to longitudinal side beams, 15 and 15$^a$, and the side members, A and B. Each of the side members, A and B, includes the posts, 16 and 16$^a$, respectively, to the inner sides of which are secured longitudinal slats, 17, 18, 19, 20 and 17$^a$, 18$^a$, 19$^a$, 20$^a$, respectively.

The posts, 16, are secured directly to the side beam, 15. The posts, 16$^a$, are hinged to the side beam, 15$^a$, in such a manner that they may be swung from a position where one side of the post rests snugly against the side of the beam to a position where the other side rests against the lower edge thereof.

The first position is illustrated in Fig. 2, and the second in Fig. 3.

Thus it will be seen that the side member, B, may be swung to a position below the bottom of the chute so that the chute will be substantially L-shaped in cross section. In this position the chute may be stood on end in the truck, 10, illustrated in dotted lines in Fig. 3, and positioned in one corner of the truck, with the side, B, adjacent the side of the truck.

To this end the slats, 17, 18, 19, 20, and 17$^a$, 18$^a$, 19$^a$, 20$^a$, are cut at one end of the chute in a plane substantially perpendicular to the bottom thereof. This end of the chute is indicated at 21 in Fig. 1. The bottom of the chute need only be about 2½ feet wide, whereas the sides are preferably nearly twice that dimension. Thus the chute will occupy the least space in the truck by standing it on end in a corner with the side resting against the side of the truck, and the bottom occupying less than one-third of the width of the truck so as not to interfere with the loading of the objects through the rear end of the truck. At the same time the chute is easily handled by placing it in the rear end of the truck where it is accessible from the rear.

In order to accomplish the hinging of the side, B, in the manner described and with as inexpensive construction as possible, I provide a U-shaped hinge element, 22, the sides of which embrace the lower ends of the posts, 16$^a$, and are secured thereto as shown. Spaced hinge loops, 23, are secured to the beam, 15$^a$, by means of straps, 24, which are formed integrally with the loops, 23, and receive the hinge elements, 22. Hinge pins, 26, are extended through the loops, 23, and hinge elements, 22, and secure them together.

The hinge elements, 22, being of the full width of the posts, 16$^a$, it will now be seen that as the side, B, is swung from one to the other of its extended positions, the pin, 26, will slide from one side to the other of the hinge element. Without this sliding connection the hinge loops, 23, would necessarily be positioned below the beam, 15$^a$, a distance equal to the width of the post, 16$^a$, thus weakening the hinge structure very materially, due to the length of the strap, 24, which would thus be exposed. When the rough usage to which such a device must necessarily be submitted is considered, it will be seen that this is an important feature.

The side, B, being of greater height than the width of the bottom, 14, I form it in two sections, the upper composing the slats, 19ª and 20ª, connected by the severed portions, 16ᵇ, of the posts, 16ª. The portions, 16ᵇ and 16ª, are connected by hinges, 27.

When used in loading, the chute is positioned with one end resting upon the ground and the other end supported by the rear of the truck, as shown in Fig. 1. For this purpose I provide a pair of hooks, 28, secured to the ends of the beams, 15 and 15ª, respectively, which are inclined in order that the hooks may more readily be engaged over the rod, 12. The bottom, 14, extends over the hooks, as shown in Fig. 1, in order that more space may be left between the floor, 11, of the truck and the bottom, in which the hoofs of animals might catch. The other ends of the beams, 15 and 15ª, are beveled, as at 29, to rest flat upon the ground.

The squared end of the chute is provided with an auxiliary sliding side piece, C, comprising the two bars, 30 and 31, connected by battens, 32, which embrace the slats, 17ª and 18ª, and 17 and 18. Thus the side piece, C, may be slid to position contained entirely between the slats, or to a position projecting therebeyond, as shown in Fig. 1.

This auxiliary side piece, C, serves to fill the gap between the sides of the truck and of the chute which is necessarily formed in view of the squared ends, 21. The opposite ends of the slats are preferably cut at an angle so as to lie in a perpendicular plane when the chute is in the position shown in Fig. 1.

In order to retain the side piece, C, in its extended position I provide hooks, 33, which are secured to the inner battens, 32, and adapted to engage screw eyes, 34, secured in the slats, 19 and 19ª.

The hook, 33, of the side piece, C, of the side, B, serves not only to maintain the side piece in extended position, but also to maintain the upper hinged part of the side, B, in raised position.

Normally the side, B, is maintained in its raised position by a chain, 35, secured to the side, B, and having a hook, 36, adapted to engage a screw eye, 27, in the side, A. The chain, 35, will also serve to maintain the upper section of the side, B, in its raised position, but in some instances the chain must be disconnected to allow exceptionally tall animals to pass, and the hook, 33, will then function in both capacities.

It will be noted that the engagement of the post, 16ª, against the side of the beam, 15ª, will serve to limit the movement of the side toward the other side, A, to the position shown in Fig. 2. Thus, when the chain, 35, is secured to the side, A, the chute will be substantially rigid.

To maintain the side, B, in collapsed position, shown in Fig. 3, I provide a bolt, 38, pivoted to the bottom, 14, as by a screw eye, 39, and carrying a block, 40, secured in place by a thumb nut, 41.

The block, 40, when turned in a position parallel to the slats, 18ª and 17ª, will be received therebetween, and when turned to the position shown in Fig. 3 will engage them and may be tightened thereagainst by means of the thumb nut, 41. In order to pass the block, 40, by the edge of the slat, 20ª, the outer hinged portion of the side, B, is swung inwardly toward the bottom, 14, until the bolt, 38, may swing sufficiently toward the slat, 20ª, to allow the block, 40, to pass the edge of the slat, 17ª.

When the block, 40, is tightened against the slats, 17ª and 18ª, thus throwing the side, B, inwardly, the slat, 19ª, will engage the beam, 15, and cause the outer hinged portion of the side, B, to swing toward the main portion thereof and to lock the rod, 38, against such lateral movement as might allow the block, 40, to become disengaged.

The chute, when swung upwardly to the position shown in Figs. 3 and 4, serves as an end gate. As the chute is swung upwardly it hinges around the rod, 12, the hooks, 28, pivoting around the rod to the position shown in Fig. 4, and the end of the floor, 14, wedging between the end of the truck floor, 11, and the rod, 12.

The squared ends of the sides, A and B, are cut to such a length as to rest against the floor, 11, when the floor of the chute is thus received in the space between the rod, 12, and the floor, 11.

It will be noted that when the chute is in this position the hooks, 28, serve to lock the chute against upward displacement, due to jolting of the truck. Any means such as the hook, 45, shown in Fig. 3, may be used to secure the chute against tipping rearwardly when it is in its raised position.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a vehicle having a bottom, a combined loading chute and end gate, of width less than that of the vehicle, said loading chute having a bottom hinged to the rear end of the vehicle so as to swing from a position extending rearwardly and downwardly relative to said vehicle bottom to a substantially vertical position, serving as an end gate for said vehicle, the chute having a fixed side member, the end of which is squared to rest against the bottom of the vehicle when the chute is in its vertical position, an auxilary sidepiece mounted on said side and slidable relative thereto, from a position extended to fill the gap between the squared end and the vehicle side when the chute is in lowered position, to a position receded rearwardly of the squared end of the chute side when the chute is in vertical position, the chute having another side hinged to its bottom and adapted to swing from a position at right angles to the chute bottom to a position extending under and substantially parallel thereto.

2. In a loading chute, a bottom having side beams, hinge pins secured to one of said beams at the lower, outer corners thereof, and parallel thereto, a side having posts provided at their lower ends with hinge elements providing hinge slots of length equal to the thickness of the posts, said slots receiving the hinge pins so as to allow the pins to slide from one side to the other of the posts, as the side is swung about the bottom from a position extending upwardly therefrom, to a position extending under and substantially parallel thereto, a fixed side secured to the other of said beams and a tension element for connecting the sides in parallel relation, the swinging side being adapted to be thereby engaged against the side of the beam to which it is hinged.

3. In a loading chute, a bottom having side beams, hinge pins secured to one of said beams at the lower, outer corners thereof, and parallel thereto, a side having posts provided at their lower ends with hinge elements providing hinge slots of length equal to the thickness of the posts, said slots receiving the hinge pins so as to allow the pins to slide from one side to the other of the posts, as the side is swung about the bottom from a position extending upwardly therefrom, to a position extending under and substantially parallel thereto, a fixed side secured to the other of said beams and means for securing the swinging side against the side of the beam to which it is hinged.

Signed at Sioux City, in the county of Woodbury and State of Iowa this 12th day of March, 1926.

FRANK DE ROOS.